United States Patent [19]

Nagao et al.

[11] Patent Number: 4,785,786

[45] Date of Patent: Nov. 22, 1988

[54] FUEL INJECTION SYSTEM FOR INTERNAL COMBUSTION ENGINE

[75] Inventors: Akihito Nagao; Sadashichi Yoshioka; Hiroyuki Oda; Takashige Tokushima, all of Hiroshima, Japan

[73] Assignee: Mazda Motor Corporation, Hiroshima, Japan

[21] Appl. No.: 874,783

[22] Filed: Jun. 13, 1986

Related U.S. Application Data

[63] Continuation of Ser. No. 678,580, Dec. 5, 1984, abandoned.

[30] Foreign Application Priority Data

Dec. 7, 1983 [JP] Japan ................................ 58-232164

[51] Int. Cl.⁴ ............................................. F02M 39/00
[52] U.S. Cl. .................................... 123/488; 123/472; 123/503
[58] Field of Search ............... 123/500, 501, 357, 358, 123/359, 472, 488, 503

[56] References Cited

U.S. PATENT DOCUMENTS

| | | | |
|---|---|---|---|
| 4,411,235 | 1/1982 | Shinoda | 123/488 |
| 4,412,520 | 11/1983 | Mitsuyasu | 123/488 |
| 4,436,072 | 3/1984 | Suzuki | 123/488 |
| 4,462,375 | 7/1984 | Isobe | 123/488 |
| 4,470,396 | 9/1984 | Hasumi | 123/488 |
| 4,485,791 | 12/1984 | Sugo | 123/472 |
| 4,495,926 | 11/1985 | Kobayashi | 123/488 |

FOREIGN PATENT DOCUMENTS 56-148636 11/1981 Japan ................................ 123/488

Primary Examiner—Carl Stuart Miller
Attorney, Agent, or Firm—Gerald J. Ferguson, Jr.

[57] ABSTRACT

An internal combustion engine is provided with a fuel injection valve. The fuel injection valve is actuated so that fuel injected therefrom reaches the combustion chamber in the latter half of the intake stroke, thereby accomplishing stratified charge. The timing at which blow-back of intake gas occurs is detected and the timing for terminating fuel injection is advanced as the timing at which blow-back of intake gas occurs becomes earlier.

7 Claims, 5 Drawing Sheets

FUEL INJECTION SYSTEM FOR INTERNAL COMBUSTION ENGINE

This application is a continuation of Ser. No. 678,580, filed Dec. 5, 1984, now abandoned.

BACKGROUND OF THE INVENTION

1. Field of the Invention

This invention relates to a fuel injection system for an internal combustion engine.

2. Description of the Prior Art

In Japanese Unexamined Patent Publication No. 56(1981)-148636, there is disclosed a fuel injection system in which so-called stratified charge is used in a partial load operation region in which high engine output is not required. Mere specifically, in the partial load operation region, fuel is injected in the latter half of the intake stroke so that the fuel and air are not mixed uniformly in the cylinder but are in layers, the air-fuel mixture in the upper portion of the cylinder (where a spark plug is positioned) being rich and that in the lower portion of the cylinder being lean. Though the air-fuel ratio of the mixture surrounding the spark plug must be sufficient to be ignited by the spark plug, the lower layer may be solely of air or of very lean mixture. Therefore, the air-fuel ratio of the overall mixture may be very lean, whereby the specific fuel consumption can be substantially reduced and at the same time, unburned components such as CO and NOx can be reduced. Further, since rich air-fuel mixture is confined in a narrow space around the spark plug and the end-gas zone is occupied by air or a very lean air-fuel mixture, abnormal combustion of the air-fuel mixture is prevented, thereby preventing detonation.

In such a fuel injection system in which stratified charge of stratified combustion is accomplished, it is generally preferred that the termination of fuel injection coincide with the end of the intake stroke. However, since the opening degree of the intake valve is small and the effective area of the intake passage is very limited in the proximity of full closure of the intake valve, and since the fuel injection valve is spaced from the combustion chamber by a distance and accordingly there is a time delay before arrival of the fuel at the combustion chamber after injection from the fuel injection valve, actually, fuel injection should be terminated before full closure of the intake valve.

In the fuel injection system disclosed in the Japanese Unexamined Patent Publication described above, the fuel injection termination timing is fixed at a certain crankshaft angle before the intake valve is fully closed, and the fuel injection starting crankshaft angle at which injection of fuel by an amount depending on the operating condition of the engine is started is calculated according to the fuel injection termination. In the fuel injection system of the prior art in which the fuel injection termination timing is fixed, there is a problem that the stratification of fuel and air in the combustion chamber may disrupted under certain operating conditions of the engine. It has been found that the stratification of fuel and air in the combustion chamber is disrupted by the following causes.

(1) As is well known, blow-back of intake gas occurs in the late period of the intake stroke during heavy-load, low-speed operation of the engine. The blow-back of the intake gas occurs when the pressure in the combustion chamber becomes higher than the pressure in the intake port as the piston moves upward, and therefore can occur when the engine operates at a low speed under partial load.

Considering the relation between the time the blow-back of intake gas occurs and the operating condition of the engine, the time the blow-back occurs generally corresponds to the time the pressure in the intake port upstream of the intake valve balances with the pressure in the combustion chamber, but since the delay in intake due to inertia in intake gas is smaller during low-speed operation of the engine than during high-speed operation of the engine, the time the blow-back occurs becomes earlier as the engine speed is lowered. Further, the time the blow-back occurs can vary with load on the engine and is generally apt to become earlier as load on the engine is reduced.

If the fuel injection termination timing is fixed at a certain crankshaft angle as in the fuel injection system disclosed in the Japanese Unexamined Patent Publication identified above, a part of injected fuel is blown back into the intake port, as the blow-back of intake gas occurs, depending on the operating condition of the engine, to stay therein and to be introduced into the combustion chamber from the beginning of the next intake stroke, thereby adversely affecting the stratification in the combustion chamber.

(2) The time necessary for injected fuel to reach the combustion chamber generally depends upon the injecting speed of the fuel and the distance between the fuel injection valve and the intake valve. When the timing of arrival of fuel at the combustion chamber is seen through the crankshaft angle, the timing varies with the engine speed. In the fuel injection system described above in which fuel injection is set to be terminated at a certain fixed crankshaft angle, a part of the injected fuel cannot reach the combustion chamber within the intake stroke and is confined in the intake port. The part of the injected fuel confined in the intake port adversely affects the stratification in the combustion chamber in the next intake stroke as in the case of the blowback described above.

SUMMARY OF THE INVENTION

In view of the foregoing observations and description, the primary object of the present invention is to provide a fuel injection system for an internal combustion engine in which proper stratification of air-fuel mixture in the combustion chamber can be obtained, when required, irrespective of the operating condition of the engine.

The above object of the present invention can be accomplished by changing the crankshaft angle at which the fuel injection is to be terminated (fuel injection termination crankshaft angle) according to the operating condition of the engine unlike in the fuel injection system in accordance with the prior art in which the fuel injection termination crankshaft angle is fixed irrespective of operating condition of the engine.

DESCRIPTION OF THE PREFERRED EMBODIMENT

Figure 1:
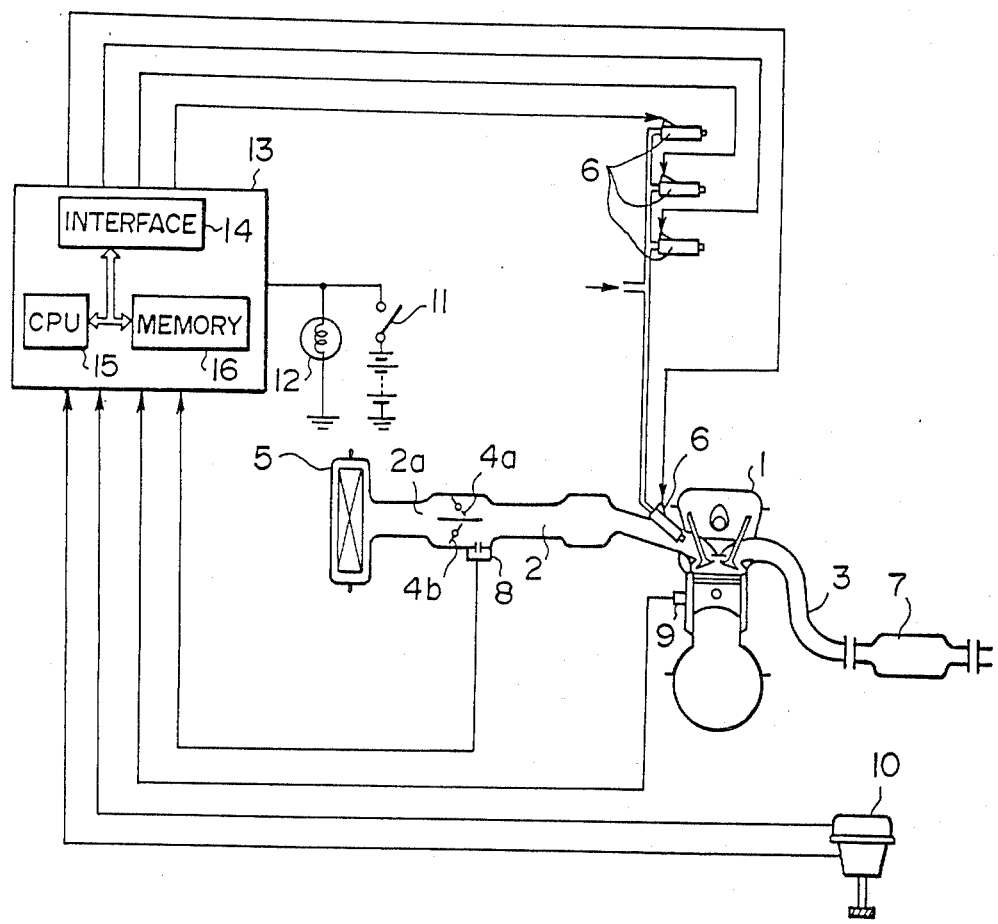
FIG. 1 is a schematic view of an internal combustion engine employing a fuel injection system in accordance with an embodiment of the present invention.

In FIG. 1, each cylinder of a four-cylinder internal combustion engine 1 (only one cylinder shown) is provided with an intake pipe 2 and an exhaust pipe 3 connected thereto. The intake pipes 2 for the four cylinders are integrated into a single intake passage 2a and first and second throttle valve 4a and 4b are provided at the integrated portion of the intake pipes 2. An air cleaner 5 is provided on the top of the intake passage 2a. Each intake pipe 2 is provided with a fuel injection valve 6 near the intake port thereof. The fuel injection valve 6 is connected to a fuel tank (not shown) by way of a fuel-pressure regulator and fuel pressure is imparted to the fuel injection valve 6 by way of the regulator so that the pressure difference between the fuel injection valve 6 and the intake pipe 2 is kept constant.

Figure 2:
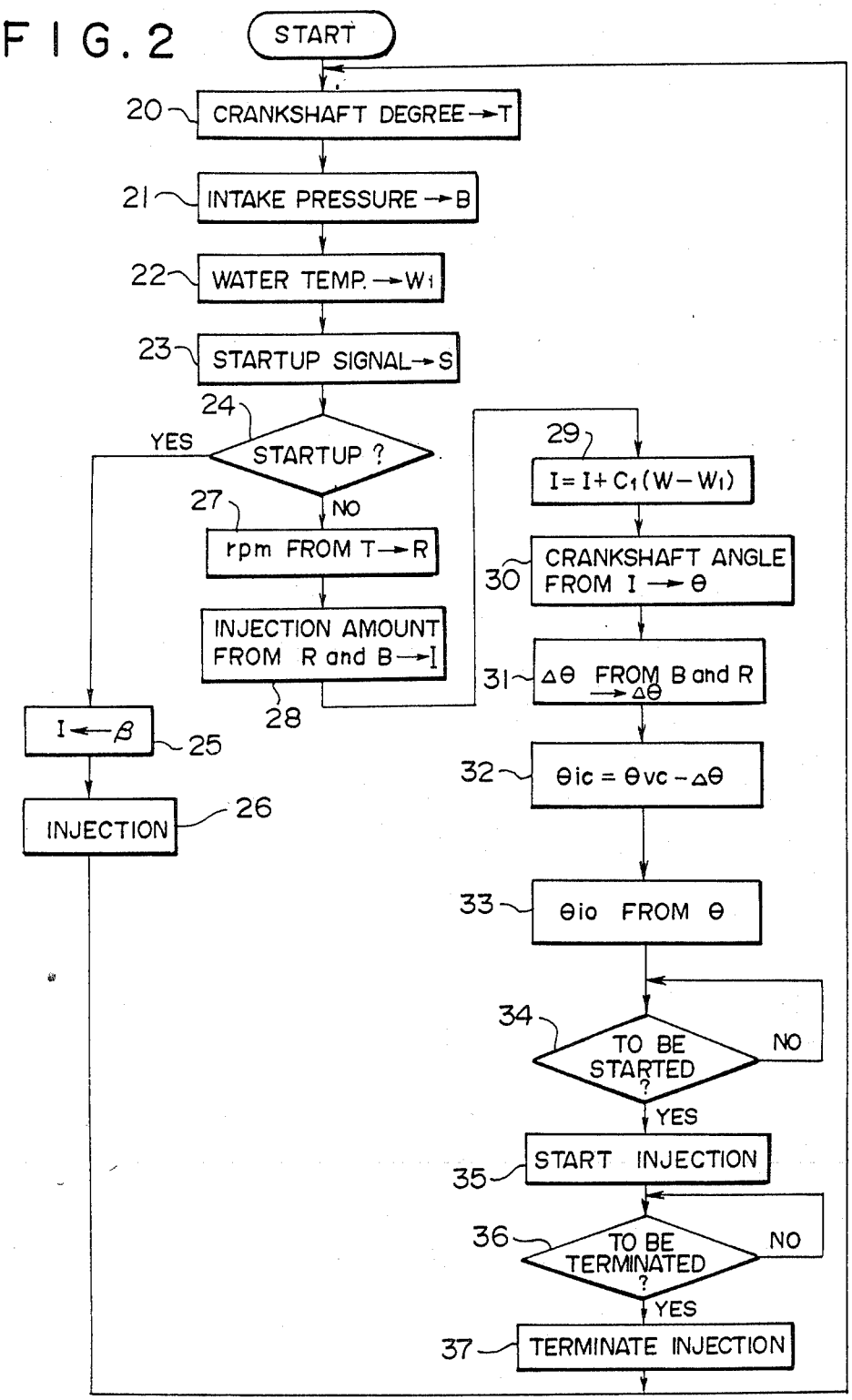
FIG. 2 is a flow chart illustrating the operation of the CPU employed in the system of FIG. 1.

Reference numerals 7, 8, 9 and 10 respectively denote a catalytic purifier provided in the exhaust system, a pressure sensor for detecting the pressure in the intake pipe 2 downstream of the throttle valves 4a and 4b, a water temperature sensor for detecting the temperature of cooling water of the engine 1, and a crankshaft angle sensor which detects the crankshaft angle and the top dead center (TDC) of the piston of the first cylinder through the angular position of the distributor. Further, reference numerals 11, 12 and 13 respectively denote an ignition switch, a starting motor and a fuel injection control circuit. The fuel injection control circuit 13 comprises an interface 14, a CPU 15 and a memory 16. In the memory 16 are stored a program for operation of the CPU 15 the flow chart of which is shown in FIG. 2, a map of a fuel injection termination timing correction amount $\Delta\theta$ which is related to the engine speed as a parameter as shown by a solid line a in FIG. 3, and the like. The fuel injection termination timing correction amount $\Delta\theta$ is determined relative to a correction amount required to compensate for the delay of injected fuel in reaching the combustion chamber (See chained line b in FIG. 3) and a correction amount required to compensate for blow-back of intake gas (See chained line c in FIG. 3). The CPU 15 delivers a startup injection pulse to the fuel injection valve 6 upon startup of the engine 1 so that a predetermined amount of fuel suitable for starting the engine 1 is injected therefrom. After the engine 1 is started, the CPU 15 calculates an actual fuel injection amount according to the operating condition of the engine 1 and at the same time, determines the fuel injection termination timing correction amount according to the engine speed by way of the map to thereby determine the fuel injection termination crankshaft angle. Then the CPU 15 delivers a fuel injection pulse having a width corresponding to the actual fuel injection amount at a time suitable for terminating injection of fuel at the determined fuel injection termination crankshaft angle. The CPU 15 controls fuel injection so that fuel is injected substantially in the latter half of the intake stroke. The term "the latter half of the intake stroke" means the period from the crankshaft angle at which the valve lift is maximized to the crankshaft angle at which the intake valve is fully closed.

Figure 3:
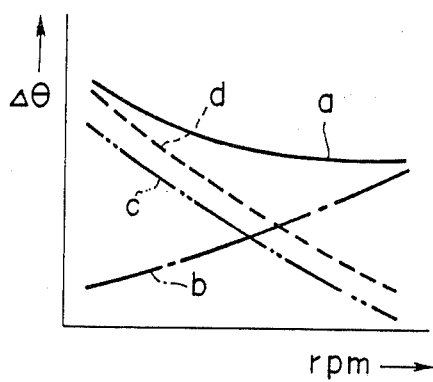
FIG. 3 is a graph showing the relation between the engine speed and the fuel injection termination timing correction amount.
Figure 4:
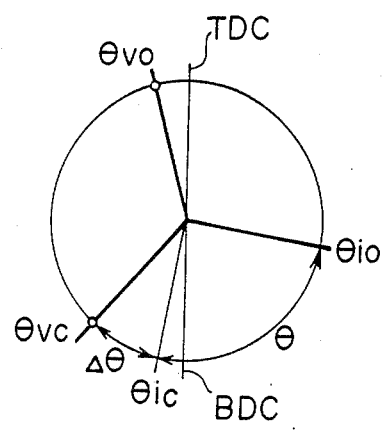
FIG. 4 is a view illustrating the relation between the timing of opening and closure of the intake valve and the fuel injection timing.

Now the operation of the engine 1 will be described in detail with reference to FIGS. 2 to 4. The relation between the fuel injection timing and opening and closure of the intake valve is shown in FIG. 4, in which the crankshaft angle at which the intake valve starts to open is represented by $\theta$vo.

When the engine 1 is operating, the CPU 15 reads signals from the crankshaft angle sensor 10, the pressure sensor 8 and the water temperature sensor 9 and stores the values of the signals in respective registers T, B and W1 in this order in steps 20 to 22 as shown in the flow chart shown in FIG. 2. In step 23, the CPU 15 reads a startup signal from the ignition switch 11 and stores it in a register S. In step 24, the CPU 15 determines whether or not the engine 1 has just started. When it is determined that the engine 1 has just started in the step 24, the CPU 15 proceeds to step 25. In the step 25, the CPU 15 stores a predetermined startup injection amount $\beta$ in a register I and generates a startup injection pulse corresponding to the value of the register I. The startup injection pulse is delivered to the fuel injection valve 6 of the cylinder to be fed with fuel which is determined by way of the TDC signal of the first cylinder (step 26). Then the CPU 15 returns to the step 20. The fuel injection amount cannot be calculated on the basis of the amount of intake air upon startup of the engine 1. This is why a predetermined startup injection pulse is generated upon startup of the engine 1.

Figure 5:
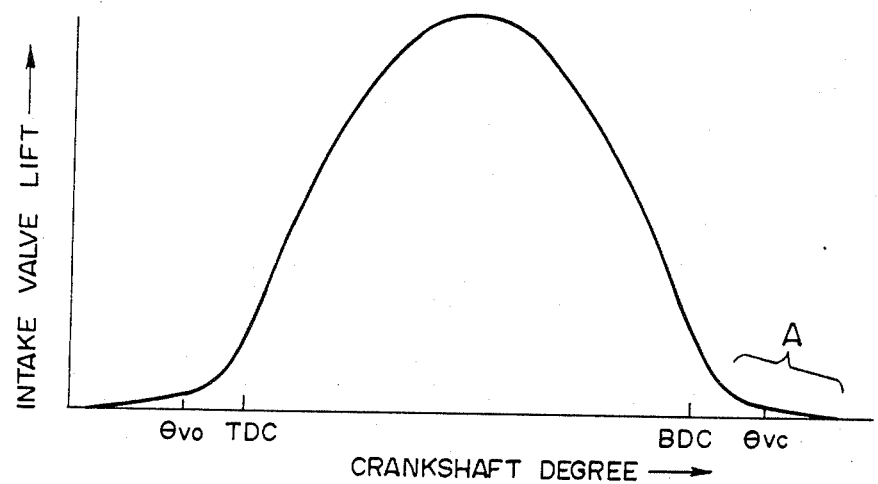
FIG. 5 is a graph showing the relation between the intake valve lift and the full closure of the intake valve.

When startup of the engine 1 is completed, the CPU 15 proceeds to step 27 after the step 24. In the step 27, the engine speed (engine rpm) is calculated based on the crankshaft angle stored in the register T and the calculated engine speed is stored in a register R. Then in step 28, a fundamental fuel injection amount is calculated based on the engine speed and the negative intake pressure stored in the registers R and B. The calculated fundamental fuel injection amount is stored in the register I. In the next step 29, the CPU 15 compares the cooling water temperature stored in the register W1 with a set value W which may be 60° C., for instance. When the cooling water temperature is not higher than the set value W, the difference therebetween (W−W1) is multiplied by a correction coefficient C1, and the product is added, as a temperature correction value, to the fundamental fuel injection amount stored in the register I to obtain an actual fuel injection amount [I+C1(W−W1)] representing the amount of fuel to be actually injected. The actual fuel injection amount I+C1(W−W1) is stored in the register I. Then in step 30, a fuel injection crankshaft angle $\theta$ through which fuel injection is to be continued (See FIG. 4.) is determined based on the actual fuel injection amount stored in the register I and is stored in a register $\theta$. A fuel injection termination timing correction amount $\Delta\theta$ (FIG. 4) is read out from the map shown in FIG. 3 according to the engine speed stored in the register R and B, and is stored in a register $\Delta\theta$ in step 31. Thereafter, a fuel injection termination crankshaft angle $\theta$ ic is determined based on an intake valve full closure crankshaft angle $\theta$ vc (FIG. 4) and the fuel injection termination timing correction amount $\Delta\theta$ in step 32. The intake valve full closure crankshaft angle $\theta$vc may be set at a crankshaft angle at which blow-back of intake gas would not occur at a reference engine speed, for instance, 3000 rpm at which the output torque of the engine 1 is maximized. For example, the intake valve full closure crankshaft angle θic may be an early crankshaft angle in the ramp (indicated at A in FIG. 5 showing the valve lift characteristics of the intake valve) of the end of the intake stroke.

After the fuel injection termination crankshaft angle θic is thus determined, the CPU 15 determines a fuel injection starting crankshaft angle θic (FIG. 4) according to the fuel injection crankshaft angle θ stored in the register θ (step 33), and stays at step 34 until the fuel injection starting crankshaft angle θic, and when the fuel injection starting crankshaft angle θic comes, the CPU 15 delivers a "1" signal to the fuel injection valve 6 to open it (step 35). The CPU 15 stays at step 36 to keep the fuel injection valve 6 open until the fuel injection terminating crankshaft angle θic. When the fuel injection terminating crankshaft angle θic comes, the CPU 15 stops outputting the "1" signal, thereby terminating fuel injection (step 37). Thereafter, the CPU 15 returns to the step 20.

As can be understood from the description above, after the engine starts, the fuel injection terminating crankshaft degree or the timing at which the fuel injection is to be terminated is determined according to the engine speed, and then the fuel injection starting crankshaft angle is determined according to the operating condition of the engine, and the fuel injection pulse is continued to be imparted to the fuel injection valve 6 from the fuel injection starting crankshaft angle to the fuel injection terminating crankshaft angle.

In the fuel injection system of the embodiment described above, the fuel injection termination timing can be set at an optimal timing according to the engine speed and thereby the injected fuel can be prevented from remaining in the intake port due to blow-back of the intake gas or delay in reaching the combustion chamber, whereby proper stratification of air and fuel in the combustion chamber can be ensured.

Figure 6:
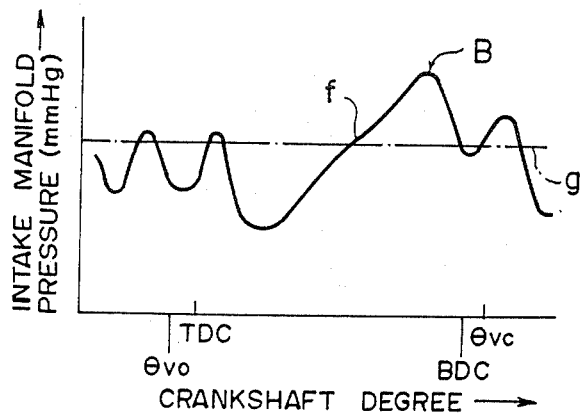
FIG. 6 is a view illustrating another embodiment of the present invention.

Though the fuel injection termination crankshaft angle is determined, in the embodiment described above, according to the engine speed in order to prevent disruption of stratification of air and fuel in the combustion chamber due to both blow-back of intake gas and delay of fuel in reaching the combustion chamber, the fuel injection termination crankshaft angle may be determined according to the pressure in the intake manifold, thereby only preventing disruption of stratification of fuel and air in the combustion chamber due to blow-back of intake gas. Though the blow-back of intake gas is mainly affected by the engine speed, it is also affected by other various factors. Therefore, the fuel injection termination crankshaft angle may be determined based on the final state affected by the various factors. FIG. 6 shows change in the intake manifold pressure in the intake stroke. In FIG. 6, the solid line f represents the intake manifold pressure (the pressure in the intake port) the the chained line g represents the pressure in the intregated portion of the intake pipes. As can be seen from FIG. 6, the intake manifold pressure f changes by a large amount under the influence of surge. As described above, blow-back of intake gas occurs when the pressure in the combustion chamber becomes higher than the intake manifold pressure in the intake stroke, and accordingly it may be considered that blow-back of intake gas occurs slightly after the intake manifold pressure f is maximized (indicated at B in FIG. 6). Therefore, the crankshaft angle B at which the intake manifold pressure f is maximized (in absolute pressure) can be set as the fuel injection termination crankshaft angle, for example.

Figure 7:
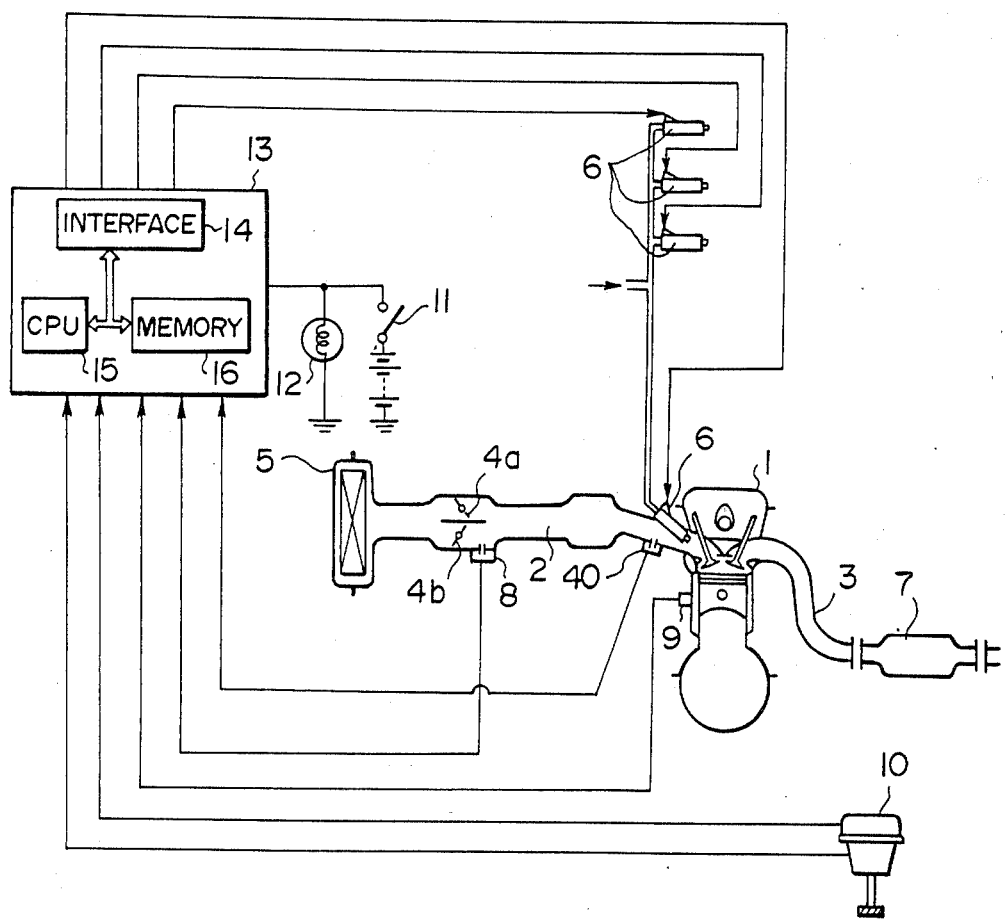
FIG. 7 is a schematic view of an internal combustion engine employing a fuel injection system in accordance with the embodiment illustrated in FIG. 6.

FIG. 7 shows an engine provided with a fuel injection system in accordance with another embodiment of the present invention in which the fuel injection termination crankshaft angle is determined according to the intake manifold pressure (the pressure in the intake port). In FIG. 7, the same reference numerals as in FIG. 1 respectively denote the same parts as in FIG. 1, and reference numeral 40 denotes a pressure sensor for detecting the intake manifold pressure (the pressure in the intake pipe 2) of the first cylinder.

Figure 8:
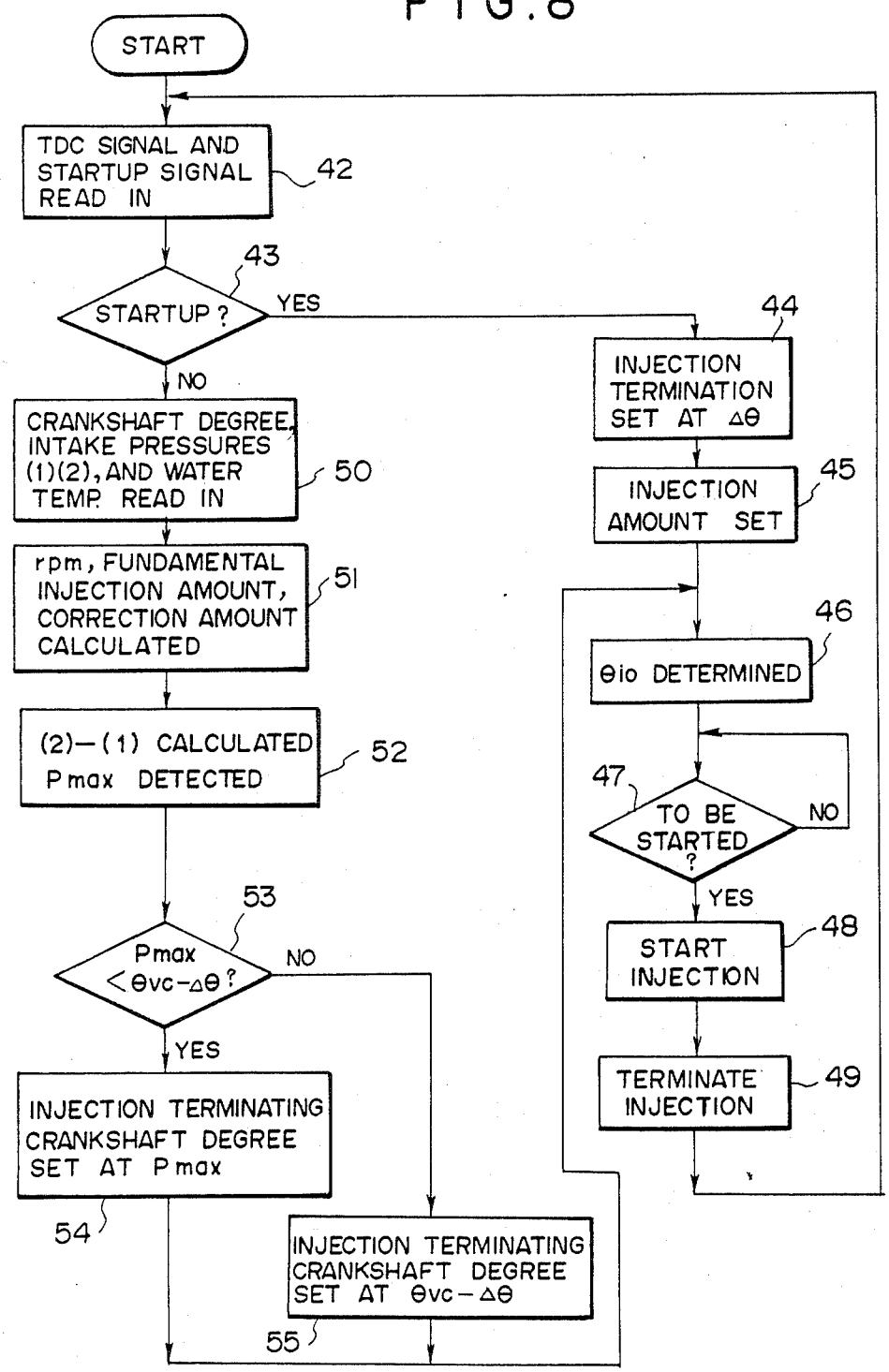
FIG. 8 is a flow chart illustrating the operation of the CPU employed in the system of FIG. 7.

The operation of the system of this embodiment will be described with reference to the flow chart shown in FIG. 8, hereinbelow.

When the engine 1 is started, the CPU 15 delivers a startup injection pulse to the fuel injection valve 6 at a predetermined timing or crankshaft angle (steps 42 to 49). When startup of the engine 1 is completed, the CPU 15 calculates the difference between the pressure in the integrated portion of the intake pipes representing the average intake manifold pressure (2) and the intake manifold pressure (1) of the first cylinder, and determines the crankshaft angle B at which the pressure difference reaches a miximum value Pmax to set the fuel injection termination crankshaft angle at the crankshaft angle B. Then a fuel injection pulse according to the operating condition of the engine 1 is fed to the fuel injection valve 6 taking into account the fuel injection termination crankshaft angle. (Steps 42, 43 and 50 to 54)

In this case, the calculated fuel injection termination crankshaft angle may sometimes have such a value that proper stratification of air and fuel cannot be obtained. In such a case, the fuel injection termination crankshaft angle is set at a crankshaft angle $(\theta vc - \Delta\theta)$ (FIG. 4). (Steps 42, 43, 50 to 53 and 55)

Also in this embodiment, stratification of air and fuel in the combustion chamber can be ensured.

Though in the above embodiments, stratified charge or stratified combustion is accomplished over the whole operating region of the engine, the present invention can also be applied to fuel injection system sin which the stratified charge is accomplished at least in light load operating condition. Further, though in the embodiment shown in FIG. 1, the fuel injection termination timing correction amount $\Delta\theta$ is determined solely depending upon the engine speed, the correction amount may be determined depending upon both the engine speed and load on the engine. This is because the fuel injection termination timing correction amount $\Delta\theta$ should be larger when the engine operates under light load than when the engine operates under heavy load as shown by dotted line d in FIG. 3.

We claim:

1. A fuel injection system for an internal combustion engine having a crankshaft and a combustion chamber, said system comprising (a) an intake passage for introducing an intake gas into said combustion chamber and provided with an intake valve; (b) a fuel injection valve for injecting fuel into said intake passage in the vicinity of said combustion chamber; (c) operating condition detecting means for detecting the operating condition of the engine and outputting a signal corresponding to the thus detected operating condition; (d) fuel injection amount determining means which receives an output signal of said operating condition detecting means, thereby determining the amount of fuel to be supplied to the combustion chamber, and outputs a signal corresponding to thus determined amount; (e) crankshaft angle detecting means for detecting the rotation angle of said crankshaft; (f) injection timing control means which receives signals from said fuel injection amount determining means and crankshaft angle deteccting means, outputs a start signal for actuating said fuel injection valve and a termination signal for terminating the actuation of said fuel injection valve, and actuates said fuel injection valve for the duration between said start and termination signals, thereby supplying an amount of fuel determined by said fuel injection amount determining means; (g) said start and termination signals being set against the crankshaft angle so that the whole fuel injection from said injection valve to said intake passage under light load operation of the engine reaches said combustion chamber substantially in the latter half of the intake stroke before said intake valve is closed; and (h) injection timing correction means which detects the magnitude of blow-back occurring in said intake passage and corrects said start and termination signals against the crankshaft angle in response to the thus detected magnitude so that said start and termination signals advance against the crankshaft angle when the magnitude of blow-back is large under low speed operation of the engine; (i) thereby effectively attaining stratification of air-fuel mixture in said combustion chamber under light load operation of the engine.

2. A method of controlling fuel injection timing for the production of a stratified charge in a combustion chamber of an internal combustion engine, comprising:
providing a fuel injection valve in an intake passage of said internal combustion engine;
controlling said fuel injection valve so that fuel injected therefrom under light engine load operation reaches said combustion chamber substantially in the latter half of the intake stroke;
detecting the operating condition of the engine;
detecting the speed of the engine;
determining the timing for terminating fuel injection relative to a crankshaft angle;
advancing the crankshaft angle for terminating injection of fuel as the timing at which blow-back of intake gas occurs becomes earlier when the detected engine speed is lower than a predetermined engine speed at which maximum torque can be obtained;
determined the duration of fuel injection according to a fuel injection amount corresponding to the operating condition of the engine; and
determining the timing for starting fuel injection on the basis of said timing for terminating injection of fuel and said duration of fuel injection.

3. A fuel injection system as defined in claim 1 in which said operating condition detecting means includes load detecting means for detecting load on the engine, and said fuel injection termination timing control means advances the timing for terminating injection of fuel as the load on the engine becomes lighter.

4. A fuel injection system as defined in claim 1 in which said operating condition detecting means includes an engine speed detecting means and an intake gas pressure detecting means for detecting the pressure in said intake passage, and the signal of said fuel injection amount determining means is determined in response to signals outputted from said engine speed detecting means and intake gas pressure detecting means.

5. A fuel injection system as defined in claim 1 in which said engine is a multicylinder engine and each cylinder has said injection valve.

6. A fuel injection system as defined in claim 1 in which said injection timing correction means has memory means for storing a signal corresponding to the correction amount for the injection timing.

7. A fuel injection system for an internal combustion engine having a fuel injection valve in an intake passage in which the fuel injection valve is controlled so that fuel injected therefrom reaches a combustion chamber substantially in the latter half of the intake stroke; operating condition detecting means for detecting the operating condition of the engine, said operating condition detecting means comprising means for detecting the peak of the intake pressure; and fuel injection termination timing control means which advances the timing for the terminating injection of fuel as the timing at which blow-back of intake gas occurs becomes earlier, said fuel injection termination timing control means controlling the timing for terminating injection of fuel to coincide with the peak of the intake pressure;
the timing at which blow-back of intake gas occurs being detected by the operating condition detecting means.

* * * * *